(12) United States Patent
Walworth et al.

(10) Patent No.: US 7,784,798 B2
(45) Date of Patent: Aug. 31, 2010

(54) GRIPPING GASKET

(75) Inventors: Van T. Walworth, Lebanon, TN (US); David B. Hook, Franklin, TN (US)

(73) Assignee: Star Pipe Products, Ltd., Houston, TX (US)

( * ) Notice: Subject to any disclaimer, the term of this patent is extended or adjusted under 35 U.S.C. 154(b) by 768 days.

(21) Appl. No.: 10/817,674

(22) Filed: Apr. 2, 2004

(65) Prior Publication Data

US 2005/0218605 A1  Oct. 6, 2005

(51) Int. Cl.
*F16L 21/02* (2006.01)
*F16L 17/03* (2006.01)

(52) U.S. Cl. .................. 277/615; 277/616; 277/625; 282/104; 282/105; 282/232

(58) Field of Classification Search ......... 277/602–616, 277/625; 285/105, 231, 232, 344
See application file for complete search history.

(56) References Cited

U.S. PATENT DOCUMENTS

| | | | |
|---|---|---|---|
| 1,930,194 A | 10/1933 | Dillon | 285/194 |
| 2,953,398 A | 9/1960 | Haugen et al. | 285/110 |
| 3,724,880 A | 4/1973 | Seiler | 285/105 |
| 3,733,093 A | 5/1973 | Seiler | 285/342 |
| 3,963,298 A | 6/1976 | Seiler | 339/95 |
| 4,108,481 A | 8/1978 | Graham | 285/231 |
| 4,229,026 A | 10/1980 | Seiler | 285/105 |
| 4,635,975 A * | 1/1987 | Campbell | 285/340 |
| 5,039,141 A * | 8/1991 | Badoureaux | 285/340 |
| 5,219,189 A * | 6/1993 | Demoisson et al. | 285/105 |
| 5,295,697 A | 3/1994 | Weber et al. | 277/181 |
| 5,464,228 A * | 11/1995 | Weber et al. | 277/615 |
| 6,688,652 B2 * | 2/2004 | Holmes et al. | 285/105 |
| 6,851,728 B2 * | 2/2005 | Minami | 285/339 |

* cited by examiner

*Primary Examiner*—Alison K Pickard
(74) *Attorney, Agent, or Firm*—Cantor Colburn LLP

(57) ABSTRACT

A novel gasket includes at least one gripping element embedded in an annular member for forming a seal between two tubulars. For tubulars having socket and spigot ends, the gripping element includes teeth for gripping an outer surface of the spigot end and a blunt tooth for contacting a front wall of the socket end. The blunt tooth rolls along the front wall during relative movement between the tubulars and can include a contacting face of a specialized geometry to adjust contact dynamics and/or roughened surfaces to increase the frictional contact between the blunt tooth and the front wall. The embedded element can also include at least four teeth arranged such that no more than two teeth normally grip the outer surface of the spigot end. One or more teeth can also include a transverse groove to enhance penetration into the outer surface of the spigot end.

18 Claims, 3 Drawing Sheets

GRIPPING GASKET

BACKGROUND OF THE INVENTION

1. Field of the Invention

This invention relates to devices for locking joints for tubular members. More particularly, the present invention relates to gaskets for sealing and locking a socket end of one tubular to a spigot end of another tubular.

2. Description of the Prior Art

Pipes joined in telescoping relationship typically have a spigot end of one pipe inserted into the socket end of the engaging pipe. The socket end has an opening large enough to receive the spigot end of the enclosed pipe. A gasket is inserted in the socket end of the enclosing pipe and prevents leakage of fluid from the joint by forming a seal between the two pipes. In many applications, a fluid under pressure flows through the pipes. This fluid pressure can produce a separating force, known as joint separating end thrust, that can cause the pipes to separate at the joint.

One method of locking the joint between two pipes involves configuring as sealing gasket as a restraining mechanism. For example, a resilient sealing gasket can be provided with a number of circumferentially spaced apart metal inserts. These metal inserts include teeth that are adapted to penetrate an outer surface of a pipe spigot end. Upon installation, the teeth bite into the pipe spigot end to prevent the pipe spigot end from sliding out of the socket end. As is known, the dimensions of the pipe spigot and socket ends, while conforming to industry standards, can vary during manufacture. The ability of the gasket to seal and lock the joint, however, can be adversely affected by such dimensional variations. Thus, there is a persistent need for sealing and restraining gaskets that can accommodate pipes having such dimensional variations. Moreover, there is a persistent need for gaskets that lock or retain a joint without unduly compromising the structure of the pipe (e.g., excessive penetration). The present invention addresses these and other needs of the prior art.

SUMMARY OF THE INVENTION

In one aspect, the present invention provides a retention and sealing device for joints between tubulars. In one embodiment, the device is used to join a first tubular having a socket end with a second tubular having a spigot end. The exemplary device includes a resilient annular member having a sealing portion for forming a seal between the first tubular and the second tubular and at least one gripping element embedded in the resilient member. The gripping element, which is formed of a relatively hard material, includes a plurality of teeth projecting radially inward relative to the socket for gripping an outer surface of the spigot end and a blunt tooth extending axially forward relative to the socket for contacting a front wall of the socket. The blunt tooth adapted to contact and roll along the front wall during relative movement between the first and second tubulars. The terms radially inward(ly) and radially outward(ly) are used with reference to the axial centerline of the tubulars (i.e., meaning pointing toward or away from the tubular centerline, respectively). The terms axially forward refers to a direction toward the end of the tubular and term axially rearward refers to a direction toward the middle of the tubular.

In certain embodiments, the blunt tooth can include features and elements for enhancing the rolling contact between the blunt tooth and the front wall of the socket end. For instance, the blunt tooth can have a contacting face of a specialized geometry (e.g. convex, concave, flat, etc.) to selectively adjust the location of initial contact, contact pressure, or other parameter (e.g., contact dynamics). Additionally, a roughened surface on the blunt tooth can be used to increase the frictional contact between the blunt tooth and the front wall. Suitable roughness can be obtained by using an irregular surface formed by grit blasting, chemical etches, spline protrusions, knurled protrusions, impregnated grit, composite constructions, bonded elements, and coated elements.

In embodiments, the embedded element can also include arrangements to enhance the locking function provided by the gripping elements, facilitate assembly, improve product life and improve performance, etc. For instance, the embedded element can include least four teeth arranged such that no more than two teeth grip the outer surface of the spigot end when the spigot end is inserted into the socket end. For instance, at least three can lie along a common arc. Additionally, the embedded element can include a ridge extending radially outwardly from the embedded element to limit the movement of the blunt tooth along the front face. In certain embodiments, at least one tooth includes a transverse groove that enhances the tooth's ability to penetrate into the outer surface of the spigot.

It should be understood that examples of the more important features of the invention have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWING

Other objects and advantages of the present invention will become apparent to those skilled in the art from the following description of the invention taken in conjunction with the accompanying drawing in which like numerals indicate like elements and in which.

DESCRIPTION OF THE PREFERRED EMBODIMENT

Figure 1:
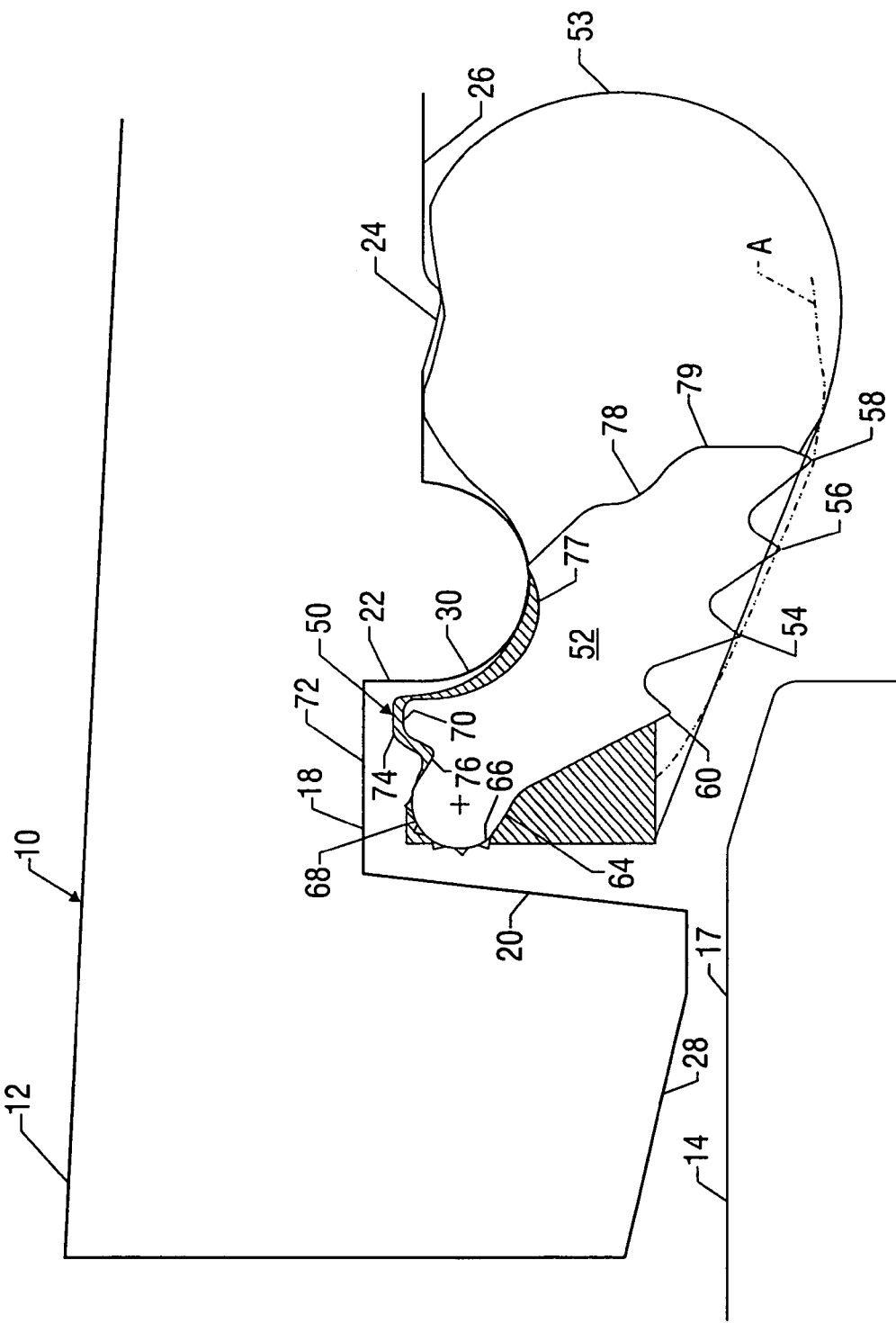
FIG. 1 illustrates a cross-sectional view of a jointed between an enclosing pipe and a mating pipe that uses a gasket made in accordance with one embodiment of the present invention.

The present invention relates to devices and methods providing rugged and cost-effective gasket arrangements for pipe joints. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. As used herein, the terms radially inward(ly) and radially outward(ly) are used with reference to the axial centerline of the tubulars (i.e., meaning pointing toward or away from the tubular centerline). The terms axially forward means in a direction toward the end of the tubular and term axially rearward means in a direction toward the middle of the tubular. Further, no particular geometry, material, or other technical limitation is implied by the term "gasket." Rather, as used herein, this term merely refers to a device for providing at least a seal at a discontinuity in a flow path of a fluid.

Referring now to FIG. 1, there is shown a joint formed by a first enclosing pipe 10 having a bell end 12 and second pipe 14 having a spigot end 16. To make up a joint, the second pipe 14 is pushed into the bell end 12 of the enclosing pipe 10. Conventionally, the inner surface of pipe bell end 12 has a retainer groove 18 bounded by a front wall 20, a retainer wall 22, a circumferential compression rib 24 that projects radially inwardly from a sealing wall 26, and a throat portion 28 that terminates at the front wall 20. Moreover, the inner surface can also include a shoulder 30 formed adjacent the retainer wall 22.

A gasket 50 made in accordance with one embodiment of the present invention locks together the pipes 10 and 14 and also provides a fluid seal at the joint. As will become apparent, the gasket 50 includes elements and features that co-act with the pipes 10 and 14 in a manner that preserves the integrity of the joint by accommodating relative motion between the pipes 10 and 14.

Figure 2:
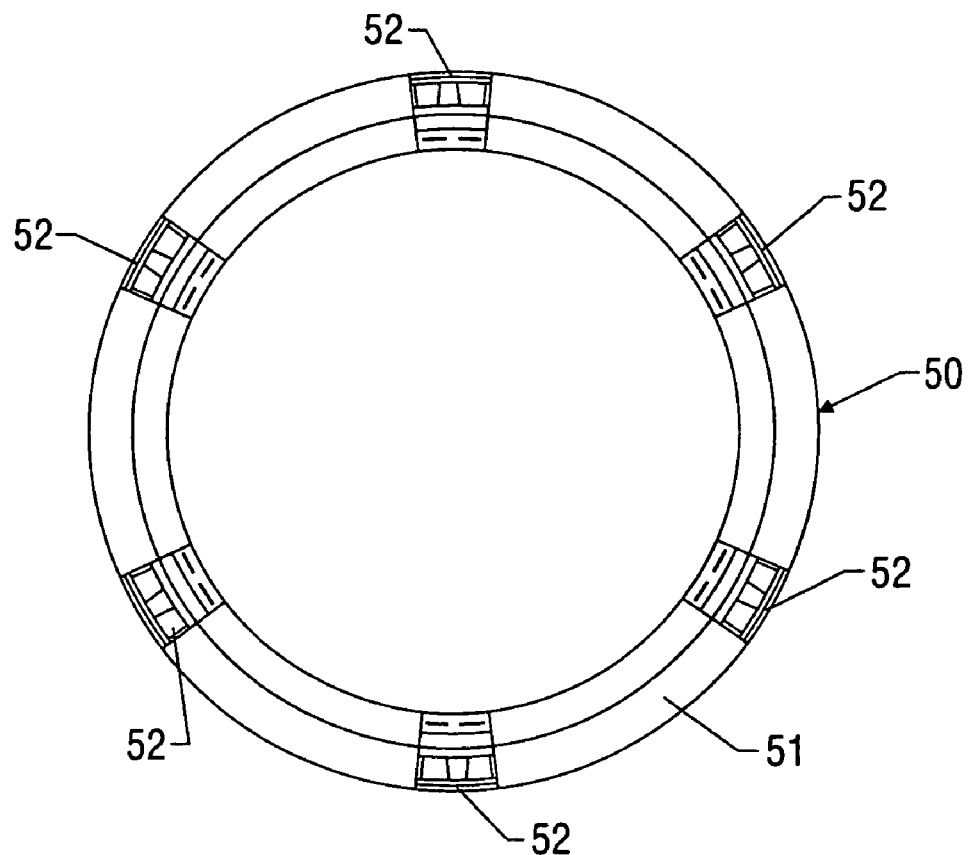
FIG. 2 illustrates an end view of a gasket made in accordance with one embodiment of the present invention.

Referring now to FIGS. 1 and 2, in one embodiment the gasket 50 includes a resilient body 51 provided with a plurality of relatively hard segments 52. The segments 52, which can be formed of a suitable metal, are circumferentially arrayed in a spaced-apart fashion within the body of the gasket 50. In one embodiment, the segments 52 are firmly vulcanized into radial grooves in gasket 50. The segment 52 can also be embedded into the gasket by bonding, encapsulation, over-molding, mechanical cooperation, or by one of many other suitable methods. The number of segments 52 inserted into the gasket 50 can vary depending upon the anticipated fluid pressure at the joint and the size of the pipes involved. The segments 52 can be suitably machined, investment cast, extruded, forged, or by other suitable manufacturing methods. The segment 52 can include one or more features for enhancing the integrity of the joint between pipes 10 and 14. While the features are described below as being provided on one segment 52, it should be understood that each feature can be utilized separately as well as in conjunction with one another.

In one embodiment, the segment 52 has three teeth 54, 56 and 58 pointed radially inwardly such that the teeth 54, 56 and 58 can bite into an outer surface of the spigot end 16 when the spigot end 16 is inserted into the pipe bell end 12. The segment 52 can include a fourth tooth 60 also adapted to bite into the outer surface of the spigot end 16. The teeth 54-60 can be equally spaced or asymmetrically spaced relative to one another. Merely for convenience, the three teeth 54, 56 and 58 will be referred to as rearwardly positioned and the fourth tooth 60 will be referred to as forwardly positioned. In one embodiment, the forward tooth 60 will be located "inside" a circle described by the common arc A of the three rearward teeth 54-58. It is believed that positioning the forward tooth 60 "inside" the boundary of the common arc, or relatively "removed" away from the spigot 16, can reduce the insertion force required to assemble the joint. It will be appreciated that when a plurality of teeth are arranged along a common arc, only two teeth can contact a flat surface at any given time (of course, excluding factors such as teeth penetration and deformation). In some embodiments, more than four teeth can be used. In such embodiments, each subsequent forwardly positioned tooth would also be located inside the common arc of the rearwardly positioned teeth such that each subsequent forward tooth would be more removed from the spigot than the preceding tooth.

Figure 3:
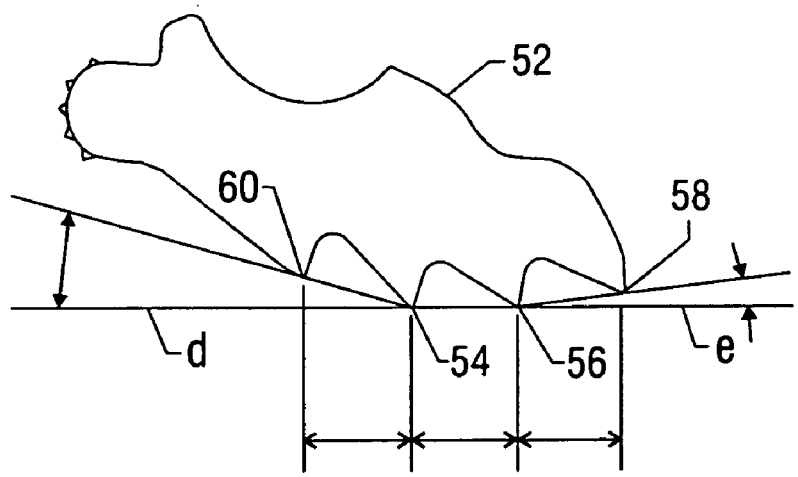
FIG. 3 illustrates a methodology for arranging inwardly projecting teeth according to one embodiment of the present invention.

Referring now to FIG. 3, another method of defining the relative positioning of four (or more) teeth 54-60 is to consider orienting the segment 52 such that a line can be drawn between the two middle teeth 56,58. A declination angle d of the forward tooth 60 is "greater" than a declination angle e of the rearward tooth 58. For instance, the angle of declination e for the rearward tooth 58 can be defined as at least 3 degrees but less than 10 degrees while the forward angle of declination d would be greater than 10 degrees but no more than about 15 degrees. Subsequent teeth rearward and/or forward would be aligned in compliance with the angles of declination defined above.

The segment 52 can also include a nose 64 projecting generally axially toward the wall 20. The nose 64 has a blunt end 66 configured to engage the wall 20. In particular, the blunt end 66 is constructed as to primarily roll on the wall 20 as opposed to biting into or sliding on the wall 20. Rolling friction between the blunt end 66 and the wall 20 can be enhanced by roughening the surface of the blunt end 66, such as by providing knurls 68 on the blunt end 66. Other methods of roughening include grit blasting, chemical etching, spline protrusions, grit impregnation, composite constructions, bonded or coated elements, etc.

Figure 4:
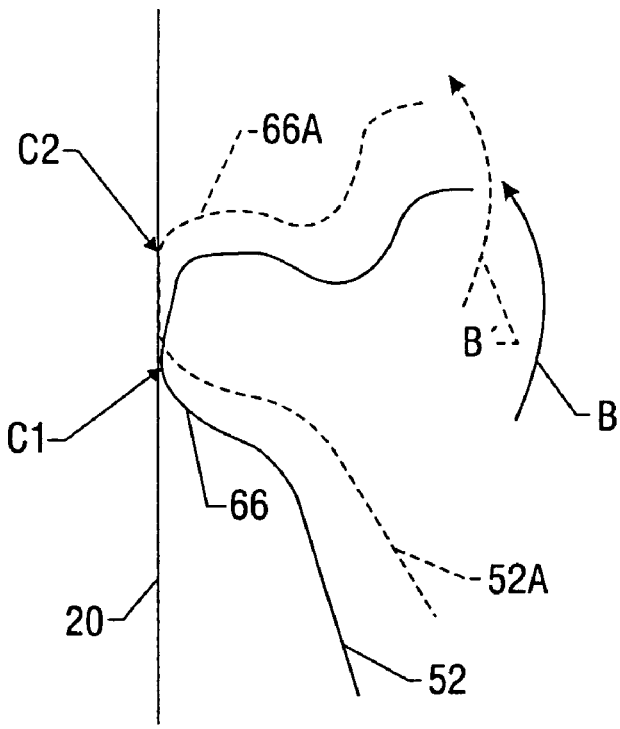
FIG. 4 illustrates the motion of a gasket insert made in accordance with one embodiment of the present invention during use.

Referring now to FIGS. 1 and 4, during use, the hydraulic pressure of the fluid flowing in the pipes 10 and 14 can create a thrust force that can cause the joints to separate joint separating end thrust). When present, the joint separating end thrust will cause the blunt nose 66 to contact the front wall 20. Once joint separating end thrust initiates contact between the blunt face and the front wall 20, the frictional interference forces are relatively static, as long as the joint separating end thrust is maintained in a static state. Frictional forces transition from static to dynamic rotational rolling forces as the segment 52 rotates (generally shown with arrow B) in response to increasing joint separating end thrust. Typically, the nose 66 of the segment 52 will have a defined contact surface area C1 with the front wall 20. Continued increasing joint separating end thrust will result in the rotation of the segment 52 as shown with arrow B. Each increment of rotation on the part of the segment 52 will result in a change in the contact surfaces between the front wall 20 and blunt nose 66. An incremental rotation is shown with segment 52A in phantom lines with an associated new contact point C2. Contact point C2 now acts as a new fulcrum or pivot point for rotation as shown by arrow B'. Thus, as the segment 52 rotates, the contact surface areas of the blunt nose 66 and the front wall 20 continually changes. Each additional increment of rotation will establish yet a new set of contact surfaces and pivot points between the blunt nose 66 and the front wall 20.

The segment 52 can also include a ridge 70 that operates as a mechanical stop to prevent excessive movement of the segment 52 during cases of extreme variations in the dimensions of the pipes 10 and 14. The blunt ridge 70 projects radially further outward than the nose 64 and ensures that the contact point between the blunt nose 60 and the front wall 20 does not migrate in such a way as to contact the most radially outward surface 72 of the socket or pipe bell end 12. The blunt ridge 70 includes resilient encapsulation 74 that provides a cushion between the blunt ridge 70 and the most radially outward surface 72 of the socket or pipe bell end 12—should they come in contact with each other. The encapsulation 74 may be confined to intermittent areas over segment 52—or be continuous around gasket OD.

In some embodiments, one or more recesses can be provided in the segment 52 to accommodate material than deforms upon the application of the forces and pressures inherent during use. For example, a recess or pocket 76 is provided between the blunt ridge 70 and the blunt nose 64. The recessed pocket 76 can be continuous or intermittent at the blunt ridge 70. In one embodiment, the volume of the recess 76 is approximately equal to the volume of the blunt ridge 70. This volumetric relationship between ridge 70 and the recess 76 gives the encapsulation 72 covering the blunt ridge 70 a place to flow into during contact—a form of void volume fill. It should be understood that fractional relationship between the volumes of the ridge 70 and the recess 76 can also be suitable in many applications. In any case, this recessed pocket 76 provides an element of flexibility and/or adjustment due to minor pipe shifting, surging, hammer, et cetera.

Also, the segment 52 further includes a scallop 78 formed on an outer rearward surface 79. Conventionally the gasket body 51 can include a sealing or bulb portion 53 that provides a fluid barrier between the pipe 10 and second pipe 14. For instance, the bulb portion 53 forms a seal between the inner wall 26 of the pipe 10 and the outer surface of the spigot end 16. The scallop 78, as will be discussed in greater detail below, can reduce the compressive forces on the bulb portion 53 and thereby reduce the risk that the bulb portion 53 bursts or otherwise fails during use.

The gasket 50 can also include a groove 77 formed on an outer circumferential diameter adjacent the ridge 70. The groove 77 is adapted to receive the shoulder 30 of the pipe bell end 12. The groove 68 is sized such that the gasket 50 can pivot at least partially around the shoulder 30 when the spigot end 16 is moving into or out of pipe bell end 12.

Figure 5:
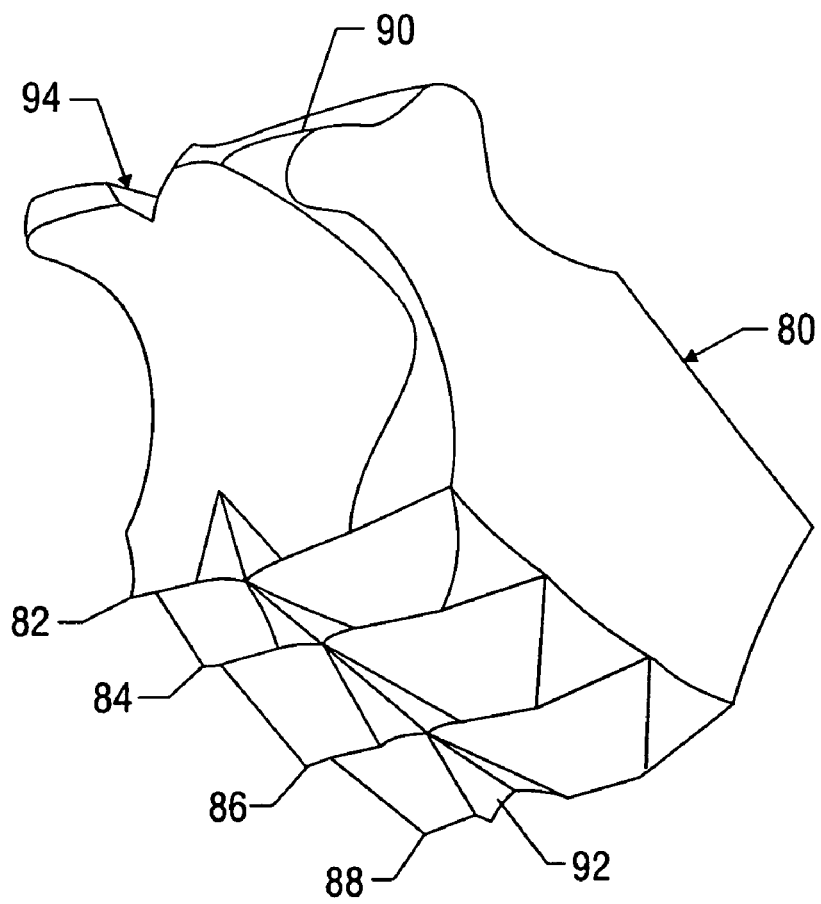
FIG. 5 illustrates an isometric view of a gasket insert made in accordance with one embodiment of the present invention.

Referring now to FIGS. 1 and 5, there is isometrically shown another segment 80 made in accordance with one embodiment with the present invention. The segment 80 includes a plurality of teeth 82, 84, 86 and 88 and a blunt nose 90. As described earlier, the teeth 82-88 extend radially inward toward the spigot 16. The teeth 82-88 include at least one groove 92 passing through each tooth 82-88. The groove 92 is transversely oriented relative to the radially inward extending teeth 82-88. By splitting the teeth 82-88, the groove 92 provides a focused contact point between the teeth 82-88 and the spigot 16. The focused contact points allow teeth to penetrate faster and deeper into the spigot or other mating surface for any set of conditions as compared convention teeth that have a more distributed loading of pressure. The groove can be constructed from many geometric forms including half-round, dovetailed, trapezoid, square, rectangular, etc. The groove 92 also provides a haven for swaged and displaced material as teeth 82-88 bite into the spigot 16, which allows the teeth 82-88 to allow enhanced penetration. Likewise, the blunt face 90 also includes at least one groove 96 that is transversely oriented relative to the axially extending blunt face 90. The groove 94 splits the blunt face 90 and provides a focused contact point between the blunt face 90 and the front wall 20. The focused contact point provides increased frictional interference forces by focusing contact loads over a smaller surface area. The groove 94 can be constructed from many geometric forms including half-round, dovetailed, trapezoid, square, rectangular, etc. This will focus the biting penetration and provide deeper and faster penetration.

In still other embodiments, the nose can be formed as an acutely pointed tooth having at least one face or the other or both faces defining the tooth to be non-linear surfaces instead of a flat surface. The purpose of at least one non-linear surface defining the faces of the tooth results in a deeper and/or faster bite penetration of the tooth into the front wall 20 for any given set of parameters. Moreover, it should also be appreciated that the groove can be applied to a tooth designed to bite into the front wall 20. Non-linear surfaces include various convex and/or concave combinations. Non-linear surfaces include ground surfaces, hollow grounding, and various other methods of achieving arcuate convex and/or concave surfaces defining the tooth. Adjusting the geometry of the blunt nose 66 can adjust the contact points between the blunt face, adjust contact pressure, and other behavior characteristics. It should be appreciated, therefore, that the contact dynamics between the blunt nose 66 and the front wall 20 can be adjusted (e.g., optimized or otherwise controlled) by altering the geometry of the blunt nose 66.

Referring now to FIG. 1, during installation, the gasket 50 is fitted into the pipe end 12 of the enclosing pipe 10. The second pipe 14 is then inserted into the pipe end 12. As the spigot end 16 of the second pipe 14 enters the gasket 50, one or more of the teeth 54, 56 and 58 contact the outer surface of the spigot end 16. The forwardly positioned tooth 69 (if present) is recessed and, therefore, does not impede the movement of the spigot end 16 into the pipe 10. As the spigot end 16 engages the teeth 54, 56 and 58, the segment 52 rotates about the shoulder 30 such that the bulb portion 53 is squeezed between the inner surface 26 and the segment surface 79. Advantageously, the scallop 78 minimizes the stresses imposed on the gasket 50 during insertion. Undue stress on the gasket during insertion can result in unnecessarily elevated insertion force—and may dislodge the gasket. The recessed scallop reduces insertion force by reducing stress introduced to the gasket—thus reducing incidence of dislodgment and/or displacement of gasket during assembly. Further, the rotation of the segment 52 can cause one or more of the rearward teeth to disengage from the spigot end 16 and the forward tooth 60 to engage the spigot end 16. Thus, it should be appreciated that the segment 52 can be constructed such that a selected or predetermined number of teeth can be made to engage the spigot end 16 regardless of the rotational orientation of the segment 52. Once the second pipe is fully inserted into the enclosing pipe 10, installation or joint make up is substantially complete.

As noted earlier, during use or operation, the hydraulic pressure of the fluid flowing through the joint can produce joint separating end thrust that can cause the spigot end 16 to slide out of the pipe 10. This sliding action causes one or more of the teeth 54-60 to bite or penetrate into the spigot end 16. As noted earlier, the particular teeth that have engaged the spigot end 16 can depend on the rotational orientation of the segment 52. Thus, the sliding motion of the spigot end 16 draws the gasket 52 axially outward until the blunt nose 66 engages the front wall 20. The blunt 66, upon engaging the front wall 20, allows the segment 52 to rotate in a controlled manner and also modulates the radial movement of the segment 52. Also, the blunt ridge 70 engages the surface 72 during excessive radial movement of the segment 52 and thereby prevents the blunt nose 66 from riding up to the surface 72.

While the invention has been described in the environment of a pipe joint in which the bell end of the enclosing pipe has a compression rib 24, the gasket will also perform its sealing function with a bell configuration such as that shown in U.S. Pat. No. 2,953,398 which does not have a compression rib. Further, it should be understood that the teachings of the present invention can be also applied to mechanical joints other than those utilizing socket-spigot ends such as for example flanged joints. That is, the present invention may be utilized in any mechanical arrangement wherein the relative movement of two tubulars (or other fluid conduits) can compromise a fluid seal there between. Further, whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

The invention claimed is:

1. A device for joining a first tubular having a socket end with a second tubular having a spigot end, the socket end having a retainer groove formed by a front wall, a radially outward surface, a retainer wall, and a circumferential compression rib that projects radially inward from a sealing wall, the device comprising:
  (a) a resilient annular member having a sealing portion for forming a seal between the first tubular and the second tubular;
  (b) at least one gripping element positioned in the resilient member, the gripping element having:
    (i) a plurality of teeth projecting radially inward toward the spigot end for gripping an outer surface of the spigot end; and
    (ii) a blunt tooth extending axially forward toward the socket end for contacting the front wall, the blunt tooth rolling along the front wall during relative movement between the first and second tubular.

2. The device of claim 1 wherein the blunt tooth includes one of (i) a convex face, and (ii) a concave face.

3. A device for joining a first tubular having a socket end with a second tubular having a spigot end, comprising:
  (a) a resilient annular member having a sealing portion for forming a seal between the first tubular and the second tubular;
  (b) at least one gripping element positioned in the resilient member, the gripping element having:
    (i) a plurality of teeth projecting radially inward toward the spigot end for gripping an outer surface of the spigot end; and
    (ii) a blunt tooth extending axially forward toward the socket end for contacting a front wall of the socket, the blunt tooth contacting and rolling along the front wall during relative movement between the first and second tubular, wherein the blunt tooth includes a roughened surface for increasing the frictional contact between the blunt tooth and the front wall.

4. The device of claim 3 wherein the roughened surface includes one of: (i) an irregular surface formed by grit blasting, (ii) chemical etches, (iii) spline protrusions, (iv) knurled protrusions, (v) impregnated grit, (vi) composite constructions, (vii) bonded elements, and (viii) coated elements.

5. The device of claim 3 wherein the plurality of teeth includes at least four teeth arranged such that no more than two teeth grip the outer surface of the spigot end when the spigot end is inserted into the socket end.

6. The device of claim 5 wherein at least three of the at least four teeth lie along a common arc.

7. The device of claim 3 wherein the gripping element includes a ridge extending radially outward from the gripping element, the ridge positioned to limit the movement of the blunt tooth along the front wall.

8. A method for joining a first tubular having a socket end with a second tubular having a spigot end, the socket end having a retainer groove formed by a front wall, a radially outward surface, a retainer wall, and a circumferential compression rib that projects radially inward from a sealing wall, the method comprising:
  (a) forming a seal between the first tubular and the second tubular with at least a portion of a resilient annular member;
  (b) positioning at least one gripping element in the resilient member, the gripping element having a plurality of teeth projecting radially inward toward the spigot end for gripping an outer surface of the spigot end, and a blunt tooth extending axially forward toward the socket end for contacting the front wall, the blunt tooth rolling along the front wall during relative movement between the first and second tubular.

9. The method of claim 8 further comprising arranging at least four teeth of the plurality of teeth such that no more than two teeth grip the outer surface of the spigot end when the spigot end is inserted into the socket end.

10. The method of claim 8 further comprising limiting the movement of the blunt tooth along the front wall using a ridge formed on the gripping element.

11. A method for joining a first tubular having a socket end with a second tubular having a spigot end, comprising:
  (a) forming a seal between the first tubular and the second tubular with at least a portion of a resilient annular member;
  (b) positioning at least one gripping element in the resilient member, the gripping element having a plurality of teeth projecting radially inward toward the spigot end for gripping an outer surface of the spigot end, and a blunt tooth extending axially forward toward the socket end for contacting a front wall of the socket end, the blunt tooth contacting and rolling along the front wall during relative movement between the first and second tubular; and
  (c) roughening a surface of the blunt tooth to increase the frictional contact between the blunt tooth and the front wall.

12. A gasket for mating a first pipe having a socket end with a second pipe having a spigot end, the socket end having a retainer groove formed by a front wall, a radially outward surface, a retainer wall, and a circumferential compression rib that projects radially inward from a sealing wall, the device comprising:
  (a) an annular body formed of a resilient material, the annular body having a central opening allowing the spigot end to enter therethrough;
  (b) a plurality of inserts positioned in the annular body, each insert having:
    (i) a plurality of teeth projecting radially inward toward the spigot end for gripping an outer surface of the spigot end; and
    (ii) a blunt tooth extending axially forward toward the socket end for contacting the front wall, the blunt tooth rolling along the front wall during relative movement between the first and second tubular.

13. A gasket for mating a first pipe having a socket end with a second pipe having a spigot end, comprising:
  (a) an annular body formed of a resilient material, the annular body having a central opening allowing the spigot end to enter therethrough;
  (b) a plurality of inserts embedded in the annular body, each insert having:
    (i) a plurality of teeth projecting radially inward toward the spigot end for gripping an outer surface of the spigot end; and (ii) a blunt tooth extending axially forward toward the socket end for contacting a front wall of the socket, the blunt tooth rolling along the front wall during relative movement between the first and second tubular, wherein the blunt tooth includes a roughened surface for increasing the frictional contact between the blunt tooth and the front wall.

14. The gasket according to claim 13 wherein the roughened surface includes one of: (i) an irregular surface formed by grit blasting, (ii) chemical etches, (iii) spline protrusions, (iv) knurled protrusions, (v) impregnated grit, (vi) composite constructions, (vii) bonded elements, and (viii) coated elements.

15. The gasket according to claim 13 wherein the plurality of teeth includes at least four teeth arranged such that no more than two teeth grip the outer surface of the spigot end when the spigot end is inserted into the socket end.

16. The gasket according to claim 15 wherein the plurality of teeth includes at least four teeth and wherein at least three of the at least four teeth lie along a common arc.

17. The gasket according to claim 13 wherein the plurality of inserts each include a ridge extending radially outward therefrom, the ridge positioned to limit the movement of the blunt tooth along the front wall.

18. The gasket according to claim 17 wherein the plurality of inserts includes a resilient encapsulation for providing a cushion between the ridge and a surface of the socket end.

* * * * *